United States Patent
Ono

(10) Patent No.: US 8,274,864 B2
(45) Date of Patent: Sep. 25, 2012

(54) SLIP GEAR STRUCTURE AND TIMEPIECE EQUIPPED WITH THE SAME

(75) Inventor: Tamotsu Ono, Chiba (JP)

(73) Assignee: Seiko Instruments Inc. (JP)

( * ) Notice: Subject to any disclaimer, the term of this patent is extended or adjusted under 35 U.S.C. 154(b) by 200 days.

(21) Appl. No.: 12/806,992

(22) Filed: Aug. 25, 2010

(65) Prior Publication Data

US 2011/0051566 A1    Mar. 3, 2011

(30) Foreign Application Priority Data

Aug. 31, 2009   (JP) ................................. 2009-200494

(51) Int. Cl.
    *G04B 19/02* (2006.01)
(52) U.S. Cl. .......................................... 368/220; 464/30
(58) Field of Classification Search .................. 368/220; 464/30

See application file for complete search history.

(56) References Cited

U.S. PATENT DOCUMENTS

| | | | | |
|---|---|---|---|---|
| 3,004,179 | A * | 10/1961 | Chartier et al. ................. | 310/83 |
| 3,443,375 | A * | 5/1969 | Cielaszyk ...................... | 368/185 |
| 3,487,633 | A * | 1/1970 | Wuthrich ....................... | 368/185 |
| 4,408,898 | A * | 10/1983 | Vuilleumier et al. .......... | 368/220 |
| 4,464,062 | A * | 8/1984 | Inage .............................. | 368/220 |
| 5,155,712 | A * | 10/1992 | Mose et al. .................... | 368/190 |
| 6,406,176 | B1 | 6/2002 | Takahashi et al. ............. | 368/101 |
| 2006/0187768 | A1 * | 8/2006 | Murazumi ...................... | 368/324 |
| 2009/0154303 | A1 * | 6/2009 | Vaucher et al. ................ | 368/322 |
| 2010/0238771 | A1 * | 9/2010 | Verardo et al. ................ | 368/322 |
| 2010/0238772 | A1 * | 9/2010 | Verardo et al. ................ | 368/324 |

OTHER PUBLICATIONS

Patent Abstracts of Japan, publication No. 09-353620, publication date Jul. 9, 1999.

* cited by examiner

*Primary Examiner* — Sean Kayes
(74) *Attorney, Agent, or Firm* — Adams & Wilks

(57) ABSTRACT

Disclosed is a slip gear structure which is easy to handle at the time of dismantling/assembly and which does not easily suffer breakage even if dismantling/assembly is repeated, and a timepiece equipped with the same. A slip gear structure for a timepiece includes: a gear main body portion in the form of an annular plate having in the outer periphery thereof tooth portions, there being provided spring portions extending across an inner opening; and a positioning member equipped with a small diameter plate-like portion having a central hole with which a shaft is rotatably fit-engaged and a pair of support wall portions arranged on both sides of the central hole and protruding from one surface. When the slip gear structure is in a non-fit-engaged state with respect to the shaft, the spring portions of the gear main body are elastically pressed against side edge portions of the support wall portions, with central spring portions thereof situated between the side edge portions protruding into the central hole; and when the slip gear structure is in a fit-engaged state with respect to the shaft at the central hole, the central spring portions of the spring portions of the gear main body portion are elastically pressed against the shaft for slip engagement with the shaft.

20 Claims, 10 Drawing Sheets

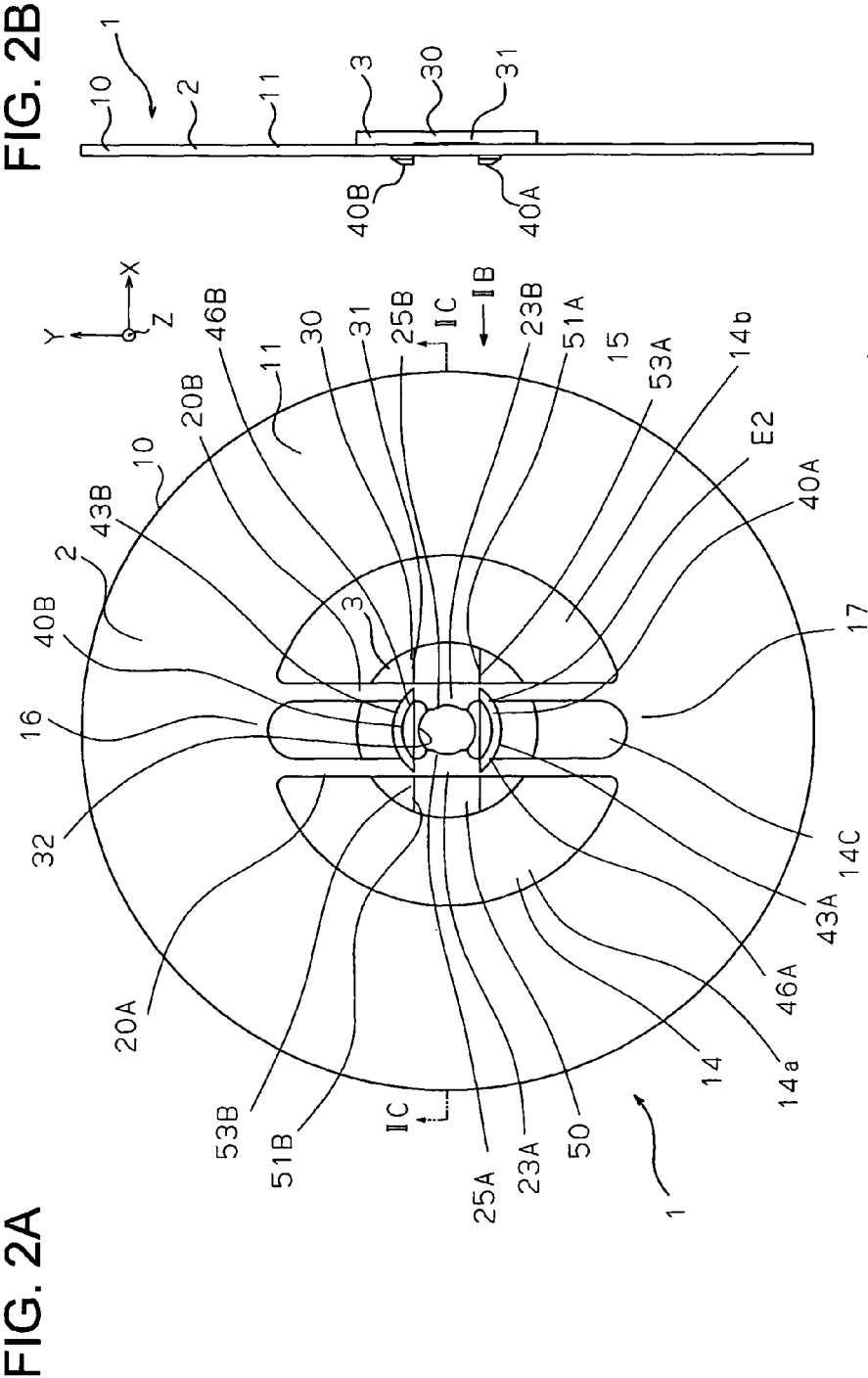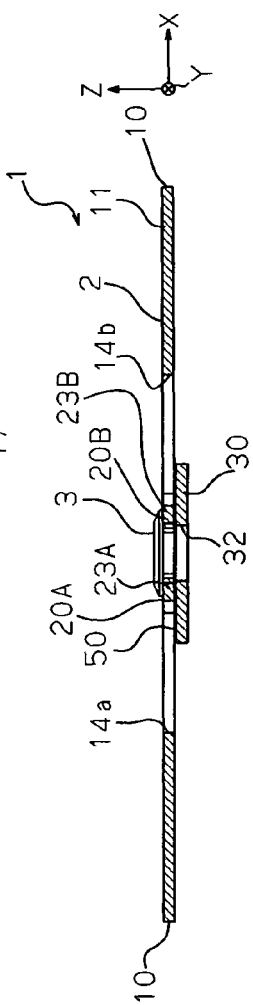

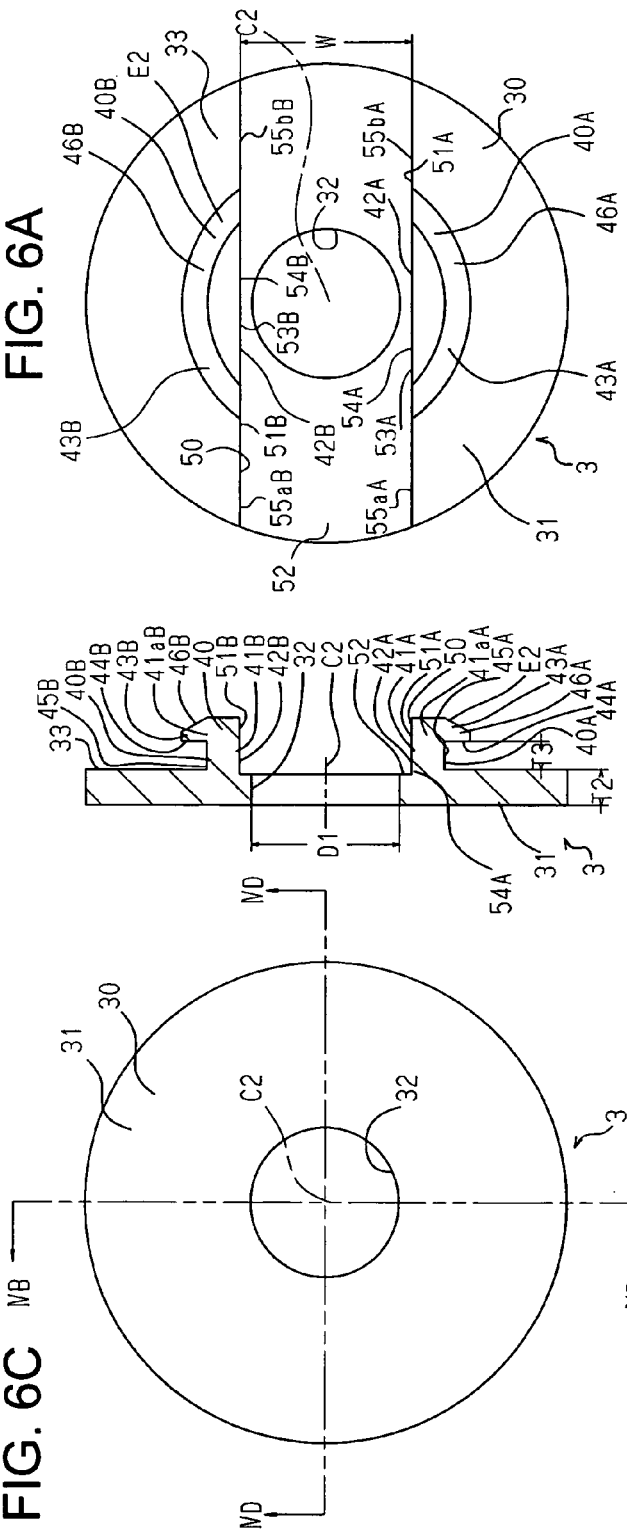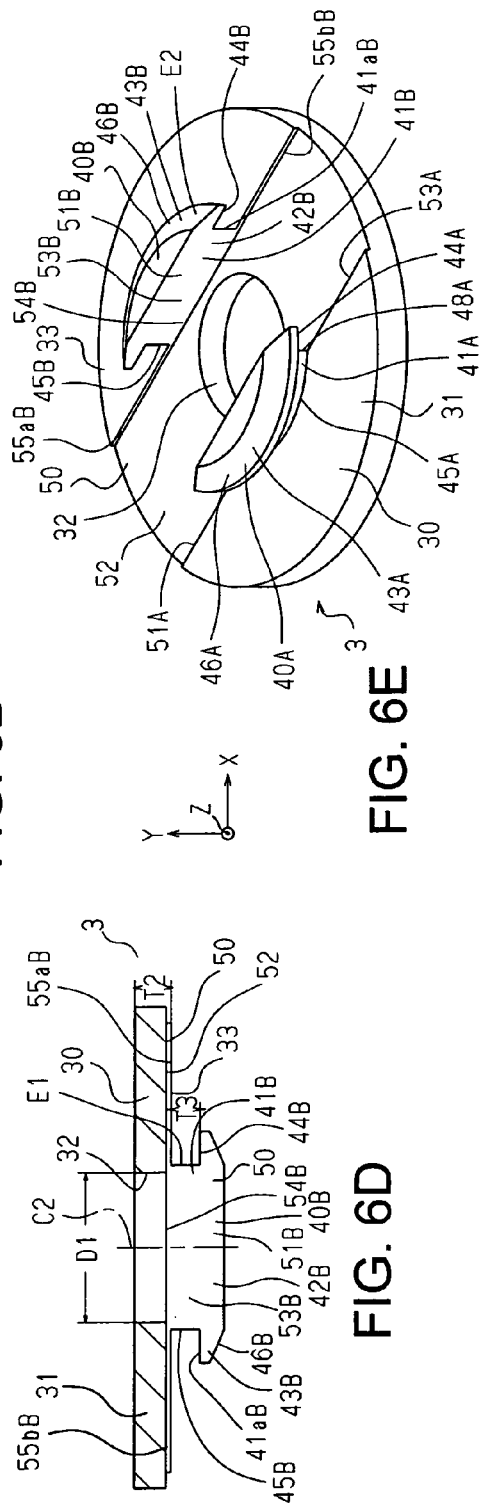

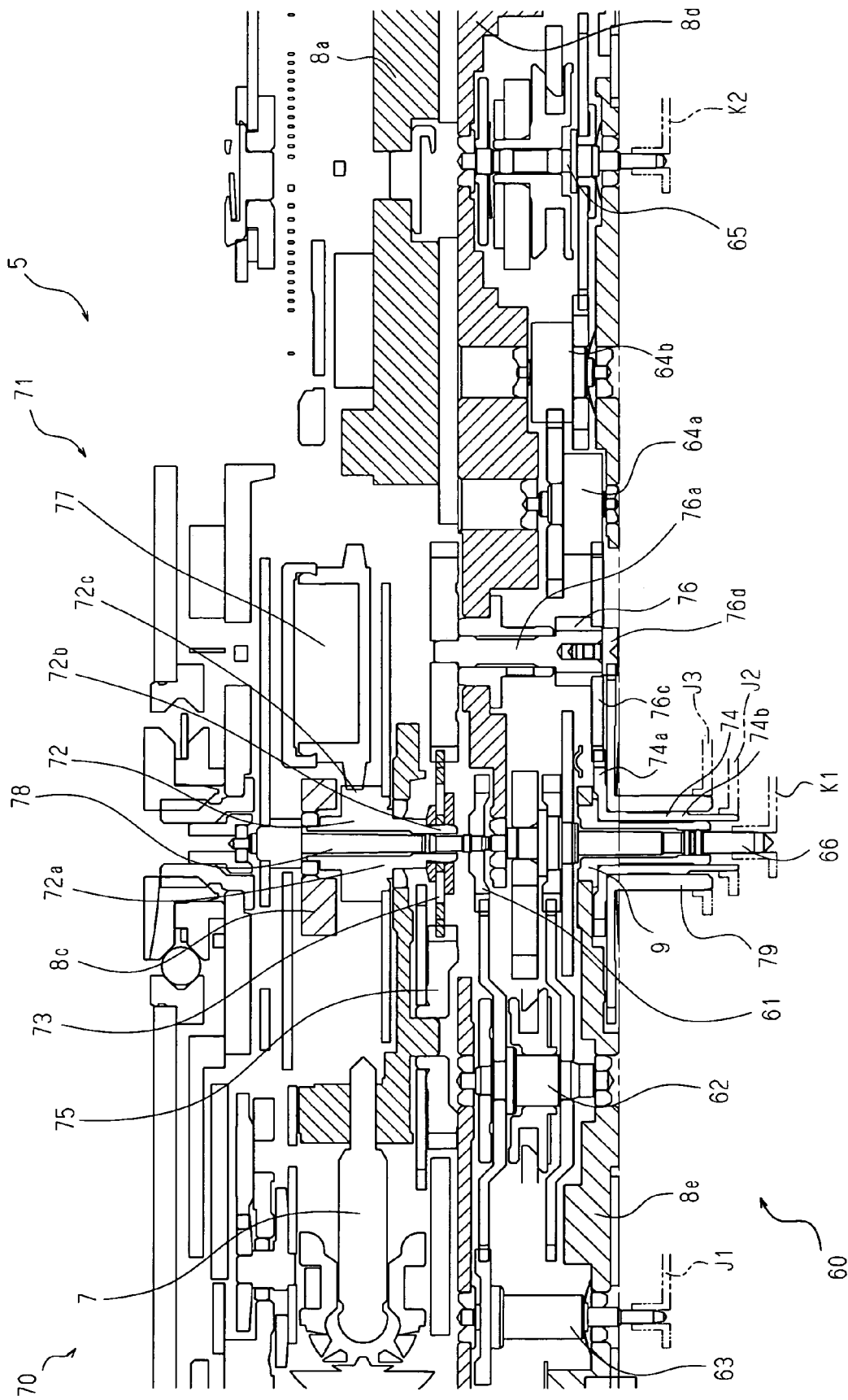

SLIP GEAR STRUCTURE AND TIMEPIECE EQUIPPED WITH THE SAME

BACKGROUND OF THE INVENTION

1. Field of the Invention

The present invention relates to a slip gear structure and a timepiece equipped with the same.

2. Description of the Related Art

There has conventionally been known a slip gear structure in which a shaft and a gear main body are slip-engaged with each other so that they may rotate integrally during normal operation and that when the load applied between the shaft and the gear increases to a degree not less than a certain level, slippage may be generated between the shaft and the gear; it is applied, for example, to a winding mark wheel of a power reserve mechanism (winding mark mechanism), and a wheel related to time correction, etc. of a chronograph timepiece or the like.

In such a slip gear, there is typically adopted a swaging structure called cannon pinion crushing (See, for example, JP-A-2000-98056).

However, this swaging structure not only requires a sufficient wall thickness for swaging, but involves generation of play when dismantling and assembly are repeated, resulting in the loss of slip engagement.

As a slip gear, there is also known one in which a gear main body is engaged with a shaft by an arm-like spring (See, for example, JP-A-11-183652).

However, in this type of slip gear using an arm-like spring, there is no appropriate portion to be retained (grabbed) at the time of dismantling/assembly, so that there is a fear of breakage at the time of dismantling/assembly, which means, this type of slip gear is not suited for application to a portion where dismantling/assembly is conducted (e.g., where gears are arranged coaxially on both main surface sides of a support substrate such as a main plate.

SUMMARY OF THE INVENTION

It is an aspect of the present invention to provide a slip gear structure which is easy to handle at the time of dismantling/assembly and which does not easily suffer breakage even if dismantling/assembly is repeated, and a timepiece equipped with the same.

According to the present invention, there is provided a slip gear structure comprising: a gear main body portion in the form of an annular plate having along the outer periphery thereof tooth portions constituting a gear, there being provided a pair of spring portions between peripheral walls of an inner opening of the annular plate so as to extend across the opening and to be arranged side by side so as to be opposed to each other; and a positioning member equipped with a small diameter plate-like portion having a central hole with which a shaft is rotatably fit-engaged and a pair of support wall portions arranged on both sides of the central hole and protruding from one surface of the plate-like portion, wherein when the slip gear structure is in a non-fit-engaged state with respect to the shaft, the spring portions of the gear main body assume a state in which they are elastically pressed against corresponding side edge portions of the pair of support wall portions of the positioning member, with central spring portions thereof situated between the corresponding side edge portions of the pair of support wall portions protruding into the central hole; and when the slip gear structure is in a fit-engaged state with respect to the shaft at the central hole, the central spring portions of the spring portions of the gear main body portion are elastically pressed against the shaft for slip engagement with the shaft.

In the slip gear structure of the present invention, "when the slip gear structure is in a non-fit-engaged state with respect to the shaft, the spring portions of the gear main body assume a state in which they are elastically pressed against corresponding side edge portions of the pair of support wall portions of the positioning member, with central spring portions thereof situated between the corresponding side edge portions of the pair of support wall portions protruding into the central hole; and when the slip gear structure is in a fit-engaged state with respect to the shaft at the central hole, the central spring portions of the spring portions of the gear main body portion are elastically pressed against the shaft for slip engagement with the shaft," so that when mounting the slip gear structure to the shaft or detaching it therefrom, the positioning member is retained (e.g., held with fingers), and the slip gear structure of the present invention is displaced with respect to the shaft, which means dismantling and assembly can be conducted easily. Further, in the slip gear structure of the present invention, there is no need to directly retain (e.g., hold with fingers) the gear main body portion with the spring portions at the time of dismantling/assembly, so that there is little fear of breakage at the time of dismantling/assembly.

Further, in the slip gear structure of the present invention, there is provided a positioning member equipped with a small diameter plate-like portion having a central hole with which a shaft is rotatably fit-engaged and a pair of support wall portions arranged on both sides of the central hole and protruding from one surface of the plate-like portion, and the plate-like portion and the support wall portions of the positioning member support the gear main body portion, so that the gear main body portion can be easily supported in a stable manner.

In the slip gear structure of the present invention, the pair of support wall portions of the positioning member are typically provided with flange-like portions diverged on a side of protruding end portions different from the side thereof opposed to the central hole, and the pair of spring portions of the gear main body portion are held in the thickness direction between the flange-like portions and the small diameter plate-like portion.

In this case, the plate-like portion and the flange-like portions of the positioning member hold the spring portions of the gear main body portion so as to be capable of supporting the same in a planar fashion over a wide range, so that it is possible to reliably regulate generation of such deformation of the spring portions as will cause the spring portions to be deviated from the plane in which the gear main body expands, so that the gear main body portion can be supported reliably in a stable manner. Thus, also when the slip gear structure is mounted to the shaft or detached therefrom, the spring portions can be reliably deformed within the plane in which the gear main body portion expands, so that the attachment/detachment to/from the shaft can be effected easily and reliably.

In the slip gear structure of the present invention, the flange-like portions are typically equipped with, in the vicinity of the outer periphery thereof, portions inclined in a truncated-cone-like fashion.

In this case, at the time of first assembly, the gear main body portion can be easily mounted to the positioning member.

In the slip gear structure of the present invention, the pair of support wall portions typically constitute part of a common column whose center coincides with the center axis of the central hole, and, on the side of the small diameter plate-like portion where the pair of support wall portions exist, the positioning member is equipped with a reamed portion extending in a direction orthogonal to the direction in which the support wall portions are connected.

In this case, a positioning member of a desired structure of the slip gear structure can be formed with high dimensional precision and with ease. However, as long as the positions of the side edge portions of the pair of support wall portions of the positioning member can be accurately specified with ease, the reamed portion may be omitted.

In the slip gear structure of the present invention, typically, the pair of spring portions of the annular plate-like gear main body portion extend in parallel.

In this case, a gear main body of a desired structure of the slip gear structure can be easily formed with high dimensional precision and with ease. However, as long as the pair of spring portions of the gear main body portion can be formed in a certain degree of precision, it is not necessary for the spring portions to be in parallel; for example, they may both be slightly bent into a V-shape or of an arcuate configuration.

In the slip gear structure of the present invention, typically, in order that the central spring portions of the pair of spring portions of the annular plate-like gear main body portion may protrude into the central hole, there are provided protruding wall portions protruding from corresponding side edges of the pair of spring portions.

In this case, a gear main body of a desired structure of the slip gear structure can be formed with high dimensional precision and with ease, and the magnitude of the slip engagement can be easily set to a desired level.

In the slip gear structure of the present invention, typically, the protruding wall portions of the central spring portions are provided, at the forward ends thereof, concave portions to be engaged with the outer periphery of the shaft.

In this case, the magnitude of the slip engagement can be made relatively large or kept stable for a long period of time.

To achieve the above aspect, a timepiece according to the present invention is equipped with a slip gear structure as described above.

Here, in the timepiece of the present invention, typically, the slip gear structure constitutes a wheel situated on the dial side of the support substrate and forming a part of a power reserve display mechanism, and a wheel situated on the dial side of the support substrate and forming a part of a time correction mechanism of a chronograph mechanism.

In these cases, in the portion of which a slip mechanism is required and which is arranged on the dial side of the support substrate so that it is expected to allow dismantling and assembly with respect to the shaft, the dismantling/assembly of the timepiece can be facilitated.

However, it is also possible for the slip gear structure to be adopted in some other portion of the timepiece.

BRIEF DESCRIPTION OF THE DRAWINGS

FIGS. 1A and 1B show a slip gear structure according to a preferred embodiment of the present invention, of which FIG. 1A is an explanatory perspective view thereof as seen from the side where a support wall portion of a positioning member exists, and FIG. 1B is an explanatory perspective view thereof as seen from the side where a small diameter plate portion of the positioning member exists;

FIGS. 2A through 2C show the slip gear structure of FIGS. 1A and 1B, of which FIG. 2A is a plan explanatory view thereof as seen from the side where the support wall portion of the positioning member exists, FIG. 2B is a sectional view taken along the line IIB-IIB of FIG. 2A, and FIG. 2C is a sectional view taken along the line IIC-IIC of FIG. 2A;

FIGS. 3A and 3B show the slip gear structure of FIGS. 1A and 1B, of which FIG. 3A is a plan explanatory view thereof as seen from the side where the small diameter plate-like portion of the positioning member exists, and FIG. 3B is an explanatory sectional view taken along the line IIIB-IIIB of FIG. 3A;

FIGS. 6A through 6E show the positioning member constituting the slip gear structure of FIGS. 1A and 1B, of which FIG. 6A is a plan explanatory view as seen from the side where the support wall portion exists, FIG. 6B is a sectional explanatory view taken along the line VIB-VIB of FIG. 6A, FIG. 6C is a plan explanatory view of the slip gear structure as seen from the side where the small diameter plate portion exists, FIG. 6D is a sectional explanatory view taken along the line VID-VID of FIG. 6C, and FIG. 6E is a perspective explanatory view of the positioning member of FIG. 6A as seen from the side where the support wall portion exists, FIGS. 7A and 7B show a plate-like gear main body portion constituting the slip gear structure of FIGS. 1A and 1B, of which FIG. 7A is a perspective explanatory view, and FIG. 7B is a plan explanatory view;

FIG. 8 is a sectional explanatory view of a chronograph timepiece according to a preferred embodiment of the present invention equipped with the slip gear structure of FIGS. 1A and 1B as a minute transmission wheel;

DETAILED DESCRIPTION OF THE PREFERRED EMBODIMENTS

Preferred embodiments of the present invention will be described with reference to the attached drawings.

As shown in FIGS. 1A and 1B, FIGS. 2A, 2B, and 2C, and FIGS. 3A and 3B, a slip gear structure 1 according to a preferred embodiment of the present invention has a gear main body portion 2, and a support member or an auxiliary member 3 serving as a positioning member.

Figure 1A:
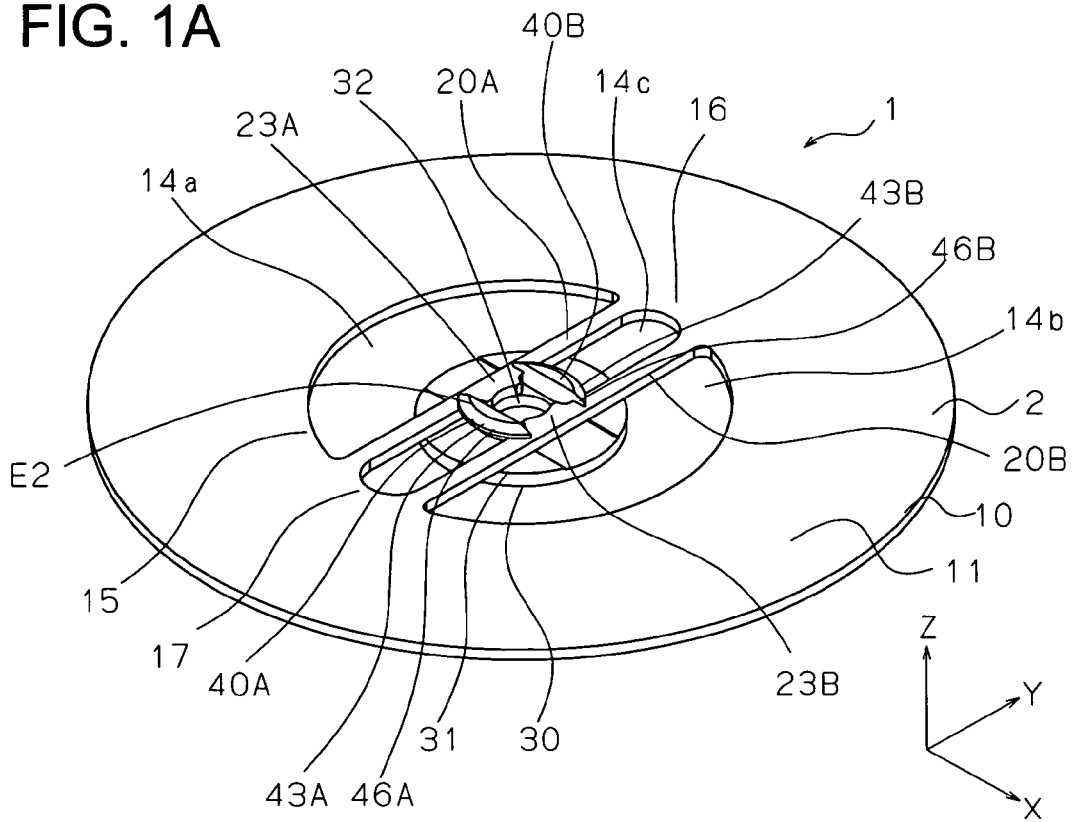
Figure 1B:
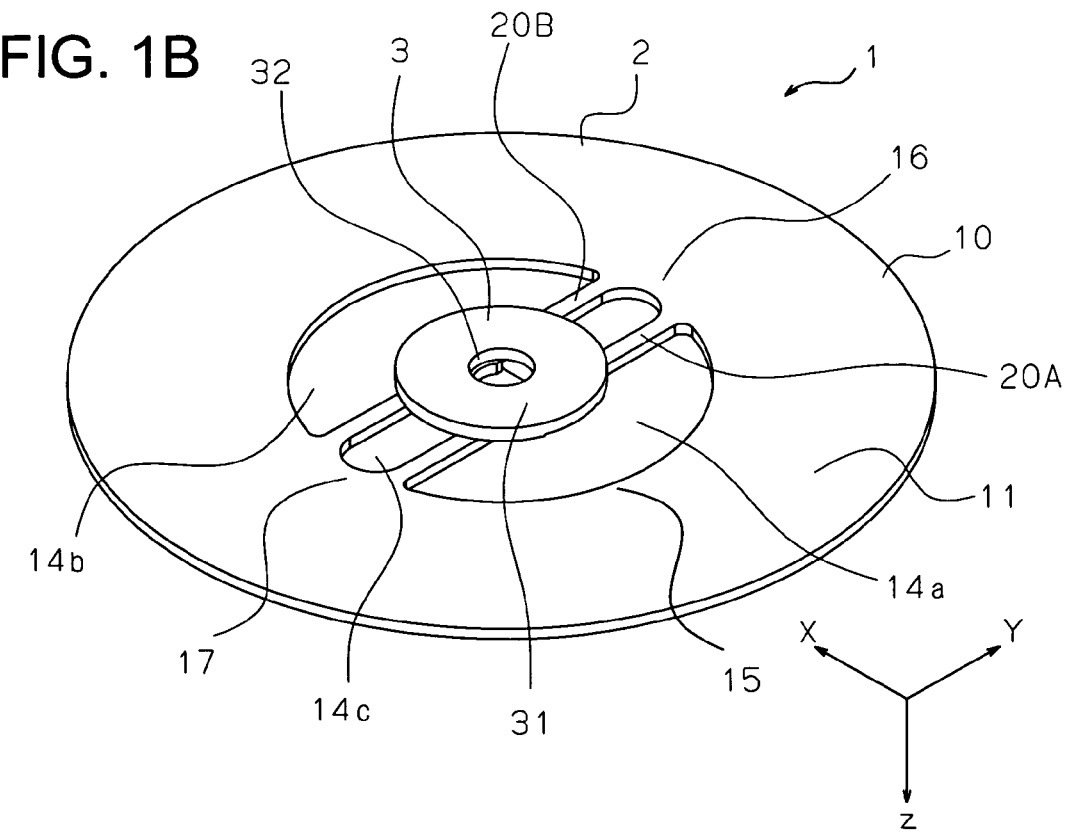
Figures 3A, 3B:
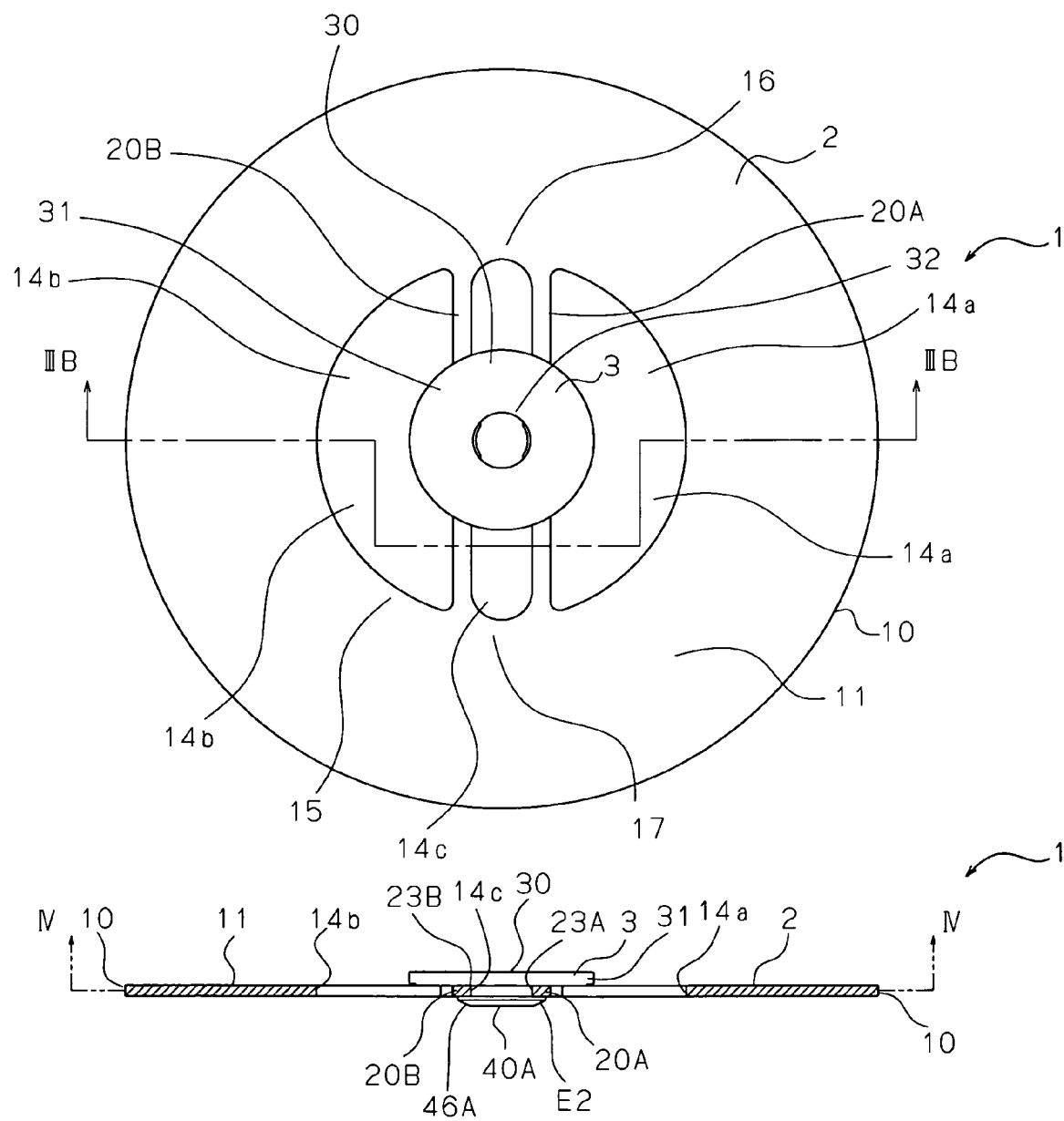
Figure 4:
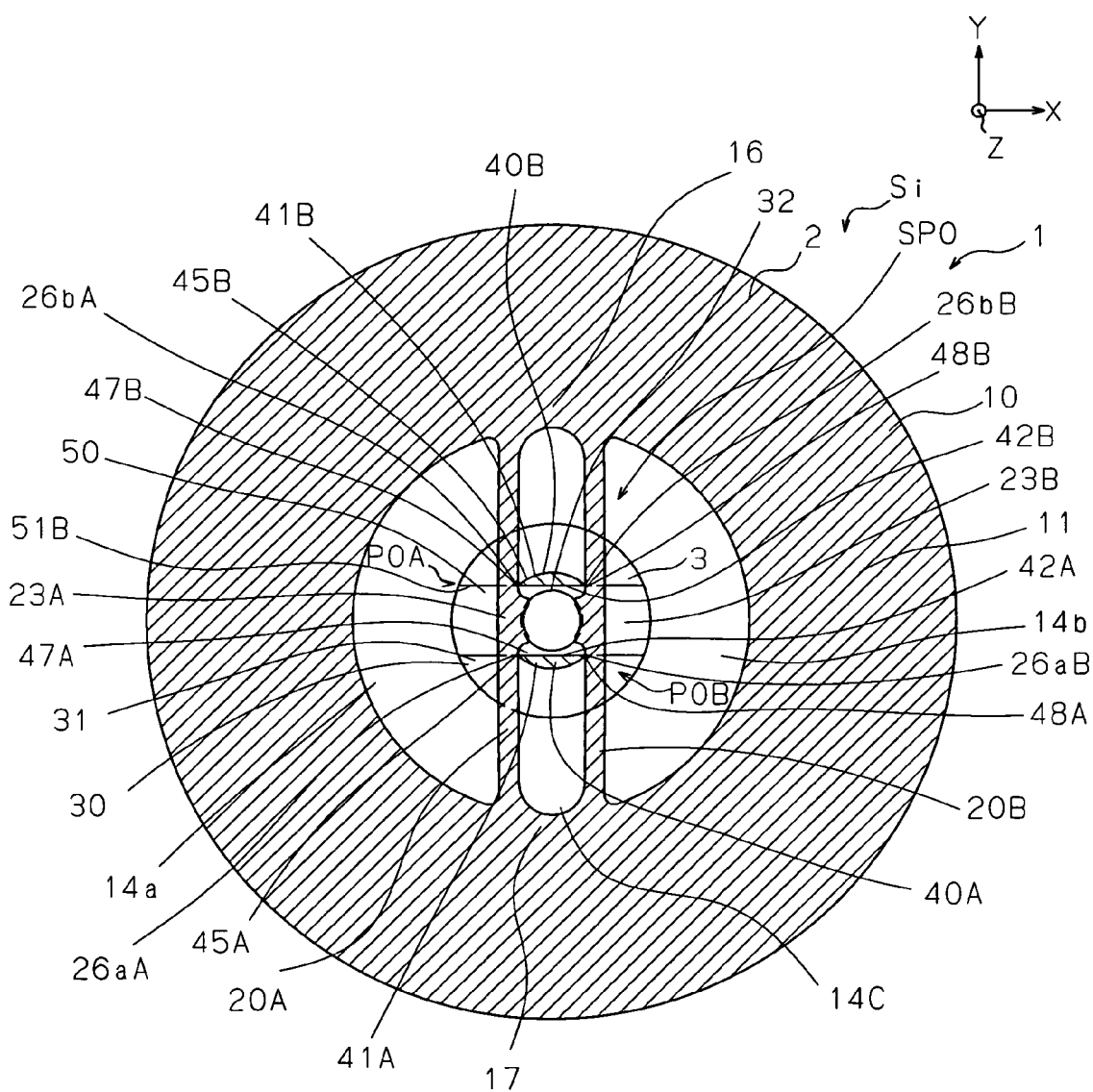
FIG. 4 is a sectional view of the slip gear structure of FIGS. 1A and 1B taken along the line IV-IV of FIG. 3B.
Figure 5:
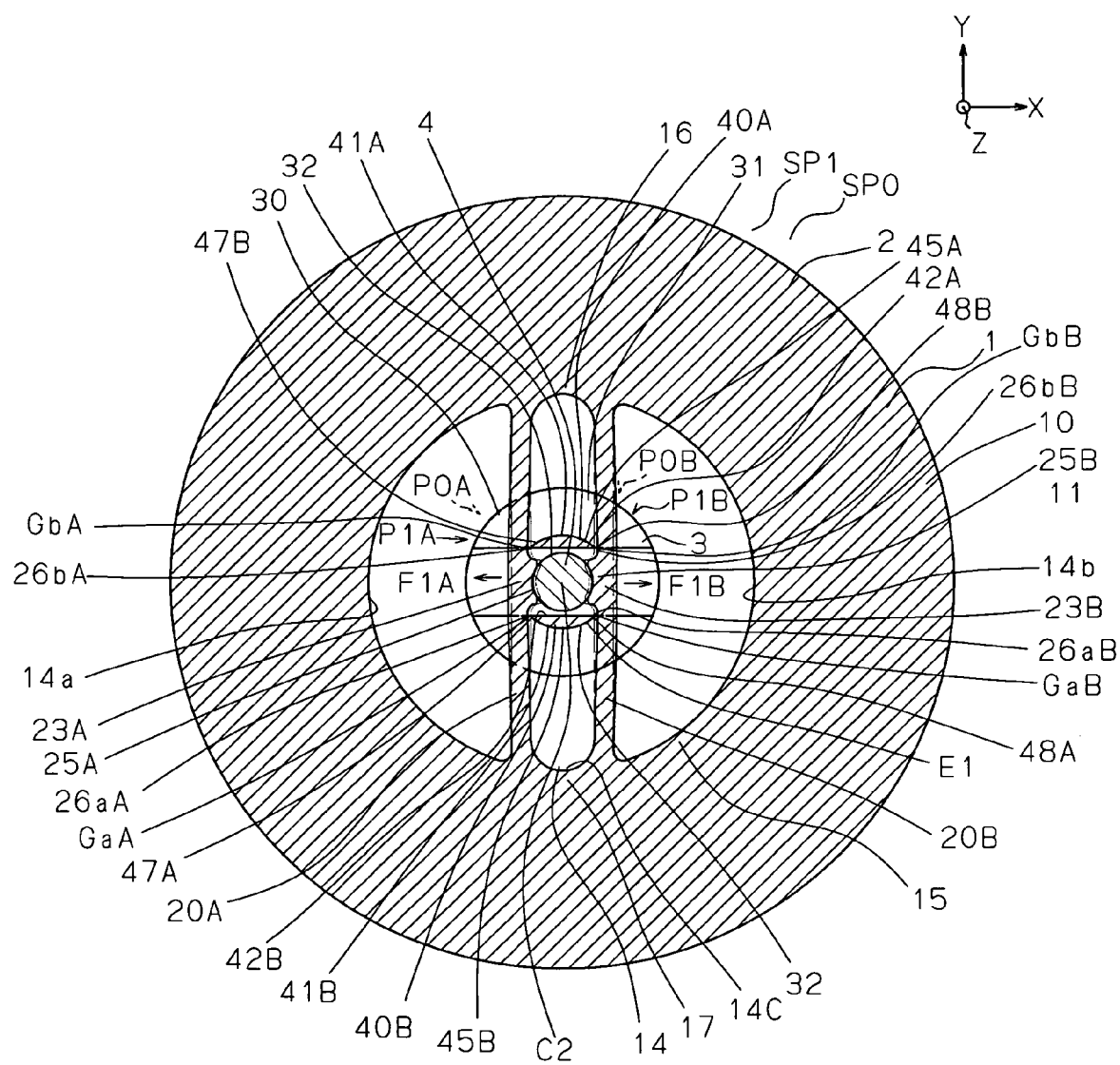
FIG. 5 is an explanatory sectional view, similar to FIG. 4, showing how the slip gear structure of FIGS. 1A and 1B is slip-engaged with a shaft.

In a state in which it is slip-engaged with a shaft 4, the slip gear structure 1 assumes a form as shown in the plan sectional view of FIG. 5, and, in the state prior to the slip-engagement with the shaft 4, shown in FIGS. 1A through 3B, it assumes a form as shown in the plan sectional view of FIG. 4.

Figure 7A:
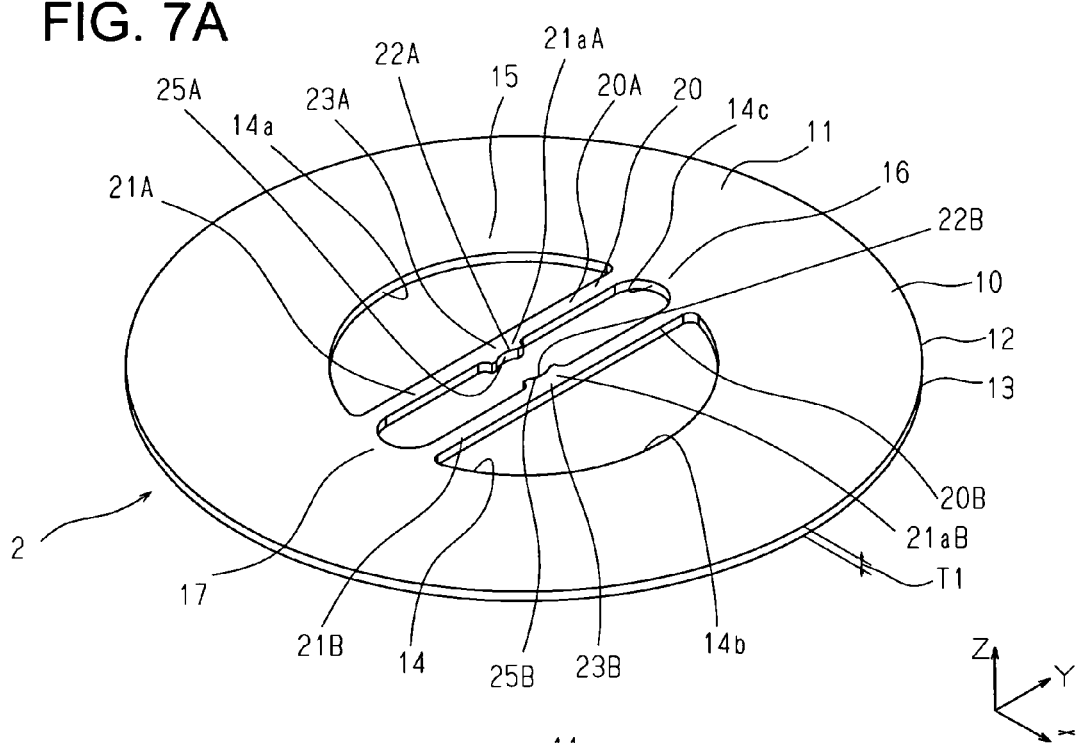
Figure 7B:
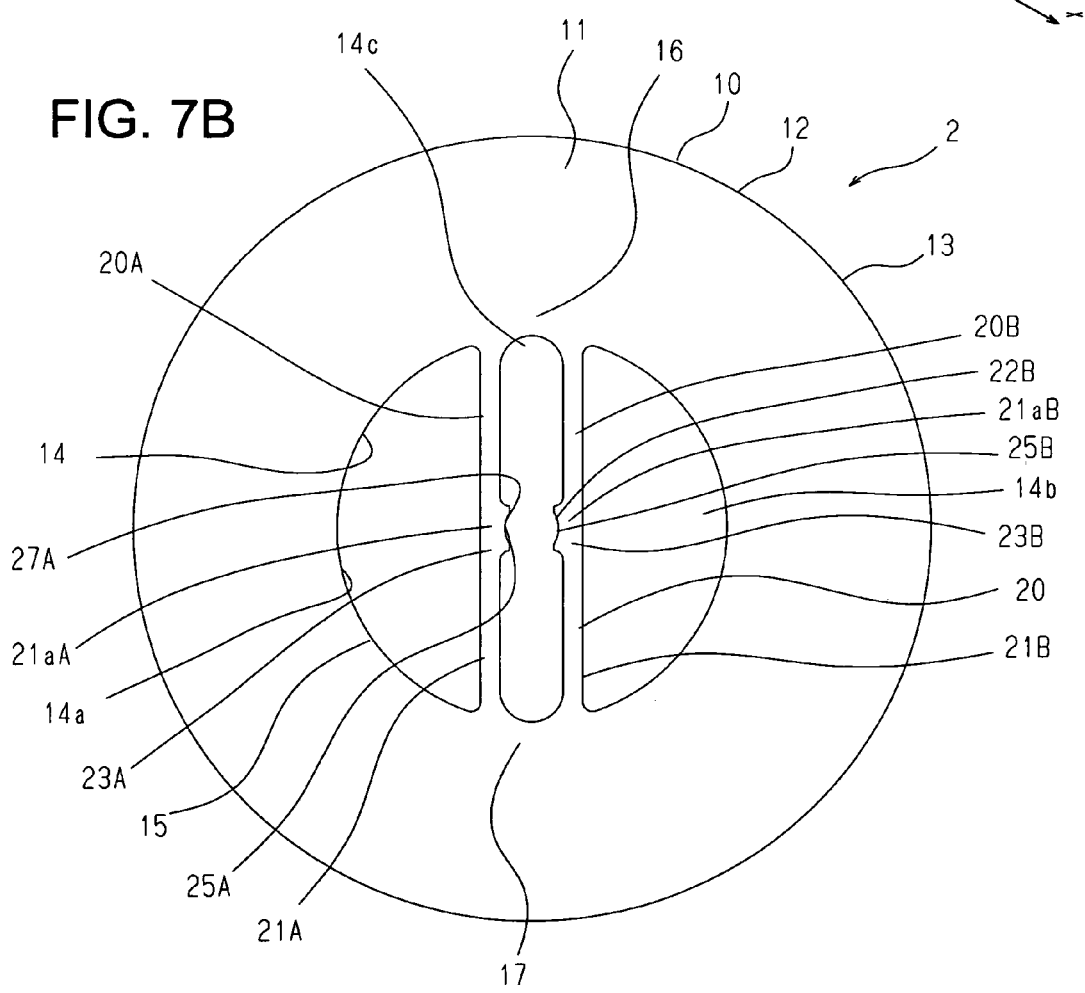

The gear main body portion 2 constituting the slip gear structure 1 has a form as shown in FIGS. 7A and 7B, and the support member or the auxiliary member 3 serving as the positioning member of the slip gear structure 1 has a form as shown in FIGS. 6A, 6B, 6C, 6D, and 6E.

The gear main body portion 2 of the slip gear structure 1 is generally of a "ring-like" configuration, and is formed as an annular plate-like portion 11 whose thickness T1 is practically fixed over the entire area. The annular plate-like portion 11 has tooth portions 13 constituting a gear 10 along a circular outer peripheral edge portion 12. Further, the annular plate-like portion 11 has at its center a generally circular opening 14, and is equipped with a pair of spring portions 20A and 20B (indicated by reference numeral 20 when they are not to be distinguished from each other or when they are collectively referred to) extending in parallel across the opening 14 so as to connect diametrically opposed peripheral wall portions 16 and 17 of a peripheral wall 15 of the opening 14. Thus, the opening 14 is composed of dome-shaped opening portions 14a and 14b on both sides and a generally rectangular central opening portion 14c between them. Both end portions of the opening portion 14c are of an arcuate configuration so as to avoid stress concentration, and the opening portion 14c is generally of an elliptical configuration.

More specifically, the spring portions 20A and 20B are generally in the form of thin and narrow strip-like portions 21A and 21B (indicated by reference numeral 21 when they are not to be distinguished from each other or when they are collectively referred to), and the strip-like plate portions 21A and 21B are equipped with engagement protrusions 23A and 23B (indicated by reference numeral 23 when they are not to be distinguished from each other or when they are collectively referred to) on mutually opposed side edge portions 22A and 22B of central spring portions 21aA and 21aB as the central spring portions. At their forward ends, the engagement protrusions 23A and 23B are equipped with arcuate engagement recesses 25A and 25B (indicated by reference numeral 25 when they are not to be distinguished from each other or when they are collectively referred to).

As described in detail below with reference to FIGS. 4 and 5, in a state SP0 in which no external force is being applied to the spring portions 20A and 20B, the spring portions 20A and 20B extend straight, and the engagement protrusions 23A and 23B of the spring portions 20A and 20B assume protruding positions P0A and P0B where they are close to each other. On the other hand, in a state SP1 in which the engagement protrusions 23A and 23B of the spring portions 20A and 20B assume retracted positions P1A and P1B where they are away from each other against the elastic force of the spring portions 20A and 20B, the arcuate engagement recesses 25A and 25B of the engagement protrusions 23A and 23B practically form a circle as a whole.

As long as the spring portions 20A and 20B are equipped with engagement protrusions 23A and 23B, the thin and narrow strip-like plate portions 21A and 21B constituting the spring portions 20A and 20B may have non-parallel portions of, for example, a V-shaped configuration, instead of being parallel to each other.

The support member or auxiliary member 3 as the positioning member of the slip gear structure 1 has a small diameter plate-like portion 30 and a pair of support wall portions 40A and 40B (indicated by reference numeral 40 when they are not to be distinguished from each other or when they are collectively referred to).

The small diameter plate-like portion 30 consists of a small diameter annular member 31 of a thickness T2. The annular member 31 has a circular central opening 32 of an inner diameter D1. The inner diameter D1 of the circular opening 32 generally coincides with the outer diameter D2 of the shaft 4 (FIG. 5) with which the gear structure 1 is slip-engaged (Strictly speaking, the former is slightly larger than the latter so as to allow slip engagement).

The support wall portions 40A and 40B (which are indicated by reference numeral 40 when they are not to be distinguished from each other or when they are collectively referred to) have a pair of columnar wall portion main body portions 41A and 41B (indicated by reference numeral 41 when they are not to be distinguished from each other or when they are collectively referred to) protruding from one surface 33 of the plate-like portion 30 at both diametrically opposed central opening 32, and flange-like portions 43A and 43B (indicated by reference numeral 43 when they are not to be distinguished from each other or when they are collectively referred to) diverged on sides different from side surfaces 42A and 42B opposed to the opening 32 at the protruding end portions 41aA and 41aB of the columnar wall portion main body portions 41A and 41B.

The distance T3 between the surface 33 of the small diameter plate-like portion 30 and opposing surfaces 44A and 44B (indicated by reference numeral 44 when they are not to be distinguished from each other or when they are collectively referred to) of the flange-like portions 43A and 43B practically coincides with the thickness T1 of the annular plate-like portion 11 of the gear main body portion 2 (Strictly speaking, the distance T3 is slightly larger than the thickness T1 so that the spring portions 20A and 20B can be elastically deformed to allow slip engagement).

Outer peripheral surfaces 45A and 45B of the columnar wall portion main body portions 41A and 41B of the support wall portions 40A and 40B constitute part of a common cylindrical surface E1 whose center is the center axis C2 of the small diameter plate-like portion 30. The flange-like portions 43A and 43B are equipped with partially-truncated-cone-shaped peripheral surface portions 46A and 46B, and the partially-truncated-cone-shaped peripheral surface portions 46A and 46B constitute part of a common truncated-cone-shaped surface E2 whose center is the center axis C2.

Between the support wall portions 40A and 40B and on the surface 31 side of the small diameter plate-like portion 30, there is formed a reamed recessed portion 50 as a reamed portion extending in a direction X orthogonal to a direction Y in which the support wall portions 40A and 40B are connected to each other. The recessed portion 50 has a fixed width W and extends in the radial direction of the small diameter plate-like portion 30. The recessed portion 50 is defined by side surfaces 51A and 51B (indicated by reference numeral 51 when they are not distinguished from each other or when they are collectively referred to) and a bottom surface 52.

The side surface 51A of the recessed portion 50 is composed of a side surface 53A formed on the surface 31 side of the small diameter plate-like portion 30 and an inner surface 42A of the support wall portion 40A. The side surface 53A of the small diameter plate-like portion 30 is composed of a surface portion 54A flush with the inner surface 42A of the support wall portion 40A and connected in the extending direction of the center axis C2, and surface portions 55aA and 55bA connected to the surface portion 54A on both sides thereof so as to be flush with the surface portion 54A. Similarly, the side surface 53B of the small diameter plate-like portion 30 is composed of a surface portion 54B flush with the inner surface 42B of the support wall portion 40B and connected in the extending direction of the center axis C2, and surface portions 55aB and 55bB connected to the surface portion 54B on both sides thereof so as to be flush with the surface portion 54B. When they are not to be distinguished from each other or when they are collectively referred to, the side surfaces 53A and 53B are indicated by reference numeral 53, and, when they are not to be distinguished from each other or when they are collectively referred to, the surface portions 54A and 54B are indicated by reference numeral 54.

As can be seen from FIG. 4 in addition to FIG. 6, the side edges 47A and 48A of the support wall portion 40A is defined by the outer peripheral surface 45A and the inner surface (reamed surface) 42A, and the side edges 47B and 488 of the support wall portion 40B is defined by the outer peripheral surface 45B and the inner surface (reamed surface) 42B. The distance between the side edges 47A and 48A of the support wall portion 40A and the distance between the side edges 47B and 48B of the support wall portion 40B coincide with the width W of the reamed recessed portion 50, and is slightly larger than the diameter D1 of the central opening 32 of the small diameter plate-like portion 30.

The engagement state of the gear main body portion 2 and the positioning member (i.e., the support member or auxiliary member) 3 when the slip gear structure 1 is in a non-fit-engagement state Si with respect to the shaft is as shown especially in FIG. 2C of FIGS. 1 through 3, and in FIG. 4.

That is, the inner edge portions 26aA and 26bA on both sides of the protrusion 23A of the strip-like plate portion 21A of the spring portion 20A extending in the direction Y of the gear main body portion 2 generally abut the side edges (X-direction end edges) 47A and 47B of the support wall portions 40A and 40B the reamed recessed portion 50 of which extends in the direction X of the positioning member 3, and the inner edge portions 26aB and 26bB on both sides of the protrusion 23B of the strip-like plate portion 21B of the spring portion 20B of the gear main body portion 2 abut the side edges (X-direction end edges) 48A and 48B of the support wall portions 40A and 40B extending in the direction X of the positioning member 3. That is, the spring portions 20A and 20B of the gear main body portion 2 extending generally in the direction Y are somewhat expanded in the direction X by the side edges (X-direction end edges) 47A and 47B of the support wall portions 40A and 40B extending in the direction X of the positioning member 3, and, in this state, they are elastically pressed against (held in contact with) the inner edge portions 26aA, 26bA and 26aB, 26bB on both sides of the protrusions 23A and 23B. However, it is not necessary for them to abut or be held in contact. As can be seen from FIG. 2C and FIG. 4, at this time, the engagement protrusions 23A and 23B of the spring portions 20A and 20B of the gear main body portion 2 protrude in the direction X and the direction −X into the central opening of the small diameter plate-like portion 30 of the positioning member 3.

On the other hand, as shown in FIG. 5, in the fit-engagement state Sf, in which the shaft 4 is fit-engaged with the central opening 32 of the slip gear structure 1, the central protrusions 23A and 23B of the spring portions 20A and 20B of the gear main body portion 2 of the slip gear structure 1 are elastically pressed against the shaft 4, and the arcuate engagement recesses or recess formation surfaces 25A and 25B at the forward ends of the protrusions 23A and 23B are elastically pressed against the outer peripheral surface 4a of the shaft 4.

In this state, when the torque applied to the slip gear structure 1 around the rotation center axis C2 of the shaft 4 is smaller than a predetermined level, the arcuate engagement recesses 25A and 25B of the protrusions 23A and 23B of the spring portions 20A and 20B are maintained in a state in which they are friction-engaged with the outer peripheral surfaced 4a of the shaft 4, so that the slip gear structure 1 rotates integrally with the shaft 4. On the other hand, when a torque of a magnitude not less than a certain level is applied to the slip gear structure 1, there is generated slippage at the arcuate engagement recesses 25A and 25B of the protrusions 23A and 23B of the spring portions 20A and 20B of the slip gear structure 1 with respect to the outer peripheral surface 4a of the shaft 4, and slipping rotation occurs. In the sense as stated above, the slip gear structure 1 is slip-engaged with the shaft 4.

As shown in FIG. 5, in the state Sf, in which the slip gear structure 1 is slip-engaged with the shaft 4, the arcuate engagement recesses 25A and 25B of the protrusions 23A and 23B of the spring portions 20A and 20B of the plate-like gear main body portion 2 of the slip gear structure 1 are engaged with the outer peripheral surface 4a of the shaft 4, so that the central portions of the spring portions 20A and 20B are pressed by the shaft 4 in directions F1A and F1B, and are deformed from the positions indicated by the dashed lines in FIG. 5 (the initial positions indicated by the solid lines in FIG. 4) P0A and P0B to the displaced positions P1A and P1B indicated by the solid lines in FIG. 5. The directions of forces F1A and F1B practically respectively coincide with the direction −X and the direction +X. That is, in the case in which the central opening 32 of the slip gear structure 1 is fit-engaged with the shaft 4, the protrusions 23A and 23B of the spring portions 20A and 20B of the gear main body portion 2 are elastically pressed against the shaft 4 in the directions X and −X with the forces F1 and F2 for slip engagement with the shaft 4.

At the displaced position P1A, the inner edge portions 26aA and 26bA of the spring portion 20A are in a non-contact state with respect to the side edge portions 47A and 47B of the support wall portions 40A and 40B, and gaps GaA and GbA are formed between the inner edge portions 26aA and 26bA of the spring portion 20A and the side edge portions 47A and 47B of the support wall portions 40A and 40B. Similarly, at the displaced position P1B, the inner edge portions 26aB and 26bB of the spring portion 20B are in a non-contact state with respect to the side edge portions 48A and 48B of the support wall portions 40A and 40B, and gaps GaB and GbB are formed between the inner edge portions 26aB and 26bB of the spring portion 20B and the side edge portions 48A and 48B of the support wall portions 40A and 40B.

In the slip gear structure 1, the spring portions 20A and 20B of the plate-like gear main body portion 2 are supported in a planar fashion over a wide range by being held in the direction Z between the small diameter plate-like portion 30 of the positioning member 3 and the flange-like portions 43A and 43B, so that when the spring portions 20A and 20B undergo deformation, the spring portions 20A and 20B are solely displaced in the direction Y within the X- and Y-planes, and there is practically no fear of such twisting as will partially cause displacement in the direction Z, so that the slip engagement can be reliably maintained.

When assembling the slip gear structure 1, the spring portions 20A and 20B of the plate-like gear main body portion 2 are held between the small diameter plate-like portion 30 of the positioning member 3 and the flange-like portions 43A and 43B. Here, in the slip gear structure 1, the flange-like portions 43A and 43B of the positioning member 3 are equipped with the partially truncated-cone-shaped peripheral surface portions 46A and 46B, so that, at the time of this assembly, it is only necessary for the flange-like portions 43A and 43B of the positioning member 3 to place the spring portions 20A and 20B of the plate-like gear main body portion 2 on the partially truncated-cone-shaped peripheral surfaces 46A and 46B and to press the same, which makes it possible to fit the spring portions 20A and 20B of the plate-like gear main body portion 2 between the small diameter plate-like portion 30 of the positioning member 3 and the flange-like portions 43A and 43B.

The slip gear structure 1 described above is applicable to a timepiece train wheel which requires slip engagement of a gear with a shaft; in particular, it is suitably applicable to a slip gear arranged on the back side (the dial side) of a main support substrate such as a main plate.

FIG. 8 shows a timepiece 5 having a chronograph mechanism 60 equipped with the slip gear structure 1. The timepiece 5 has a base unit 70 and a chronograph mechanism or chronograph unit 60.

As can be seen from FIGS. 1 and 8, the timepiece 5 equipped with the base unit 70 in the form of a movement main body 71 has a deformed center wheel & pinion 72 equipped with a short cylindrical portion 72a, a minute transmission wheel 73, and a second minute indicator 74. Further, the timepiece 5 with a chronograph function equipped with the base unit 71 has a first minute wheel 75 and a second minute wheel 76. Here, the first minute wheel 75 serves as a time correction transmission wheel transmitting the rotation of a winding stem 7. The minute transmission wheel 73 is friction-engaged or slip-engaged with a small diameter portion 72b formed at the dial side end portion of the short cylindrical portion 72a of the deformed center wheel & pinion 72. The minute transmission wheel 73 consists of the slip gear structure 1 as shown in FIGS. 1 through 7.

That is, as the spring portions 20A and 20B of the plate-like gear main body portion 2 are engaged with the shaft 4, in the minute transmission wheel 73, a spring portion of the plate-like gear main body portion thereof is friction-engaged or slip-engaged with a small diameter portion 72b of the deformed center wheel & pinion 72 corresponding to the shaft. Thus, when torque is imparted from a barrel cogwheel 77 of a barrel drum 77 to a pinion portion 72c of the deformed center wheel & pinion 72, the minute transmission wheel 73 rotates integrally with the deformed center wheel & pinion 72, and, when torque is imparted to the minute transmission wheel 73 from the first minute wheel 75, the minute transmission wheel 73 is slip-rotated with respect to the deformed center wheel & pinion 72 connected to the speed-increasing side.

The second minute indicator 74 is coaxial with the minute transmission wheel 73, and is situated on the dial side of the chronograph unit 60. The second minute indicator 74 has a second minute pinion 74a and a cylindrical portion 74b. The cylindrical portion 74b is fit-engaged so as to be capable of sliding rotation around a central pipe 9.

The second minute wheel 76 is equipped with cogwheel portions 76b and 76c of the same diameter and coaxially attached to a shaft 76a, and is in mesh with the minute transmission wheel 73 and the second minute pinion 74a to connect the two cogwheel portions 73 and 74a; at the same time, a minute pinion 76d thereof on the dial side of the cogwheel portion 76c rotates an hour wheel 79 via an hour cogwheel 79a.

A second arbor 78 is connected to a second indicator 63 via a second transmission wheel 61 and a second counter intermediate wheel 62. On the other hand, the second minute wheel 76 rotates a minute counting wheel 65 from the cogwheel portion 76c via first and second minute counter intermediate wheels 64a and 64b. Further, a second counting wheel 66 is arranged coaxially with the hour wheel 79 and the second minute indicator 74, and is rotated via a second counter intermediate wheel 62 at the time of chronograph operation.

As a result, there is obtained the chronograph timepiece 5 equipped with a second hand J1, a minute hand J2, an hour hand J3, a chronograph second hand K1, a chronograph minute hand K2, and a chronograph hour hand (not shown). In FIG. 1, numeral 8a indicates a main plate, numeral 8c indicates a second wheel bridge, numeral 8d indicates a chronograph main plate, and numeral 8e indicates a chronograph bridge.

In the chronograph timepiece 5 constructed as described above, the deformed center wheel & pinion 72 of which slip operation is required at the time of hand matching (time correction) consists of the above-described slip gear structure 1, so that when, for example, at the time of dismantling of the timepiece 5, the base unit 70 and the chronograph unit 60 are dismantled, it is possible to detach the main portion 71a of the movement main body 71 toward the case back side (in the direction Z1 in FIG. 1) solely by detaching the minute transmission wheel 73 in the form of the slip gear structure 1 on the dial side of the main plate 8a from the short cylindrical portion 72a of the deformed center wheel & pinion 72 serving as the shaft 4.

In the slip gear structure 1, the small diameter plate-like portion 30 can be easily held with fingertips or the like, so that, solely by holding the small diameter plate-like portion 30 and drawing it out in the direction Z2, the positioning member 3 including the small diameter plate-like portion 30 and the plate-like gear main body portion 2 connected thereto can be easily detached from the shaft, that is, the short cylindrical portion 72a of the deformed center wheel & pinion 72. Thus, the dismantling can be easily conducted.

Conversely, in the case of assembly, solely by holding the small diameter plate-like portion 30 and fit-engaging the central opening 32 with the short cylindrical portion 72a of the deformed center wheel & pinion 72 serving as the shaft and pushing the same in the direction Z1, the positioning member 3 including the small diameter plate-like portion 30 and the plate-like gear main body portion 2 connected thereto can be easily fit-engaged with the shaft, that is, the short cylindrical portion 72a of the deformed center wheel & pinion 72.

In the slip-type minute transmission wheel 73, that is, the slip gear structure 1, at the time of fit-engagement/release of the fit-engagement of the slip gear structure 1 with respect to the short cylindrical portion 72a of the deformed center wheel & pinion 72 serving as the shaft 4, it is only necessary to hold with fingers the small diameter plate-like portion 30 of the slip gear structure 1, and there is no need to hold with fingers the function portion constituting the spring portions 20A and 20B of the slip gear structure 1, so that the incorporation and the removal of the slip gear structure 1 can be effected easily and reliably. Thus, the attachment/detachment of the slip type minute transmission wheel 73, that is, the slip gear structure 1, to/from the shaft 4, that is, the dismantling/assembly of the chronograph timepiece 5 can be conducted over and over again.

Figure 9:
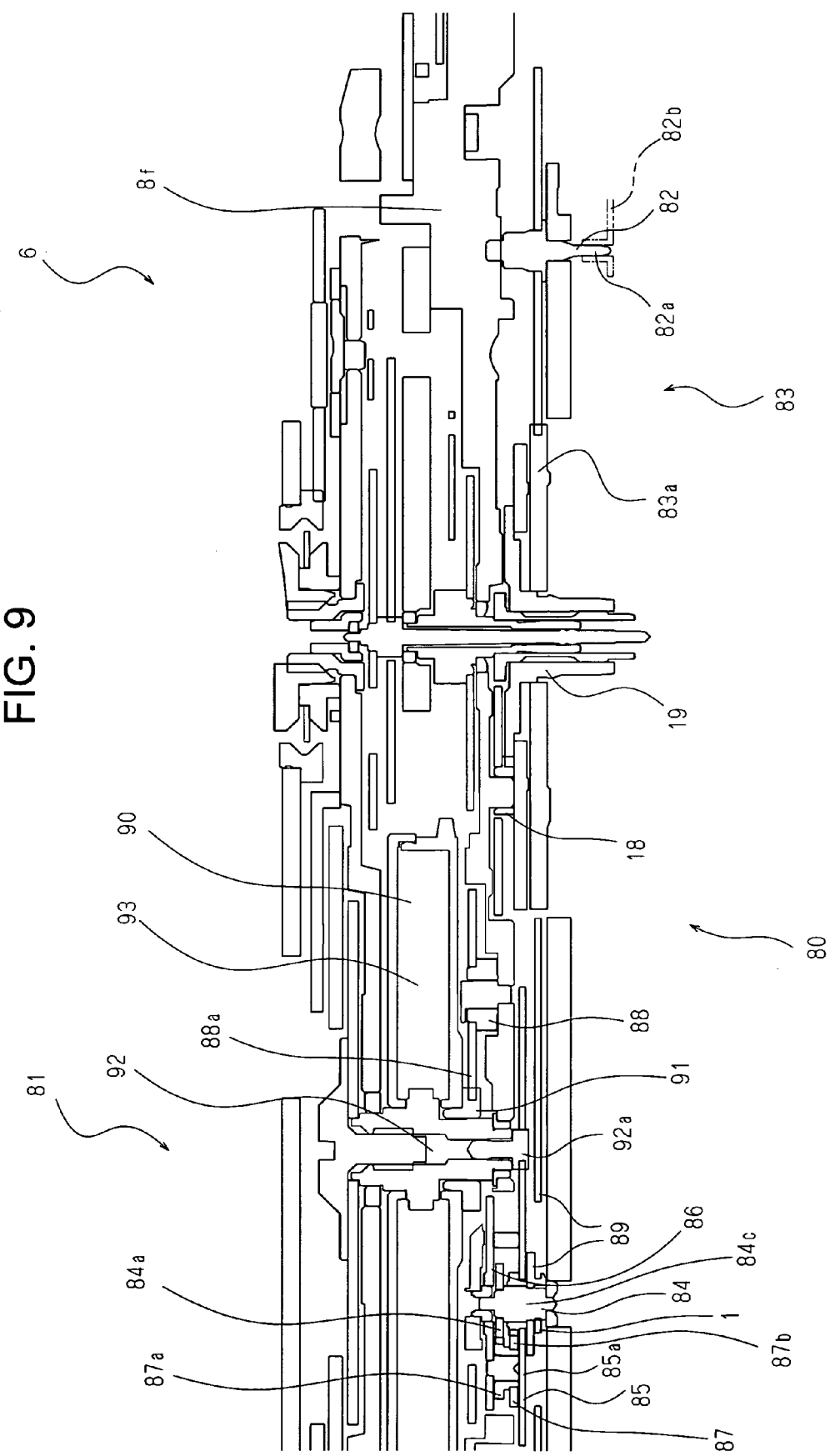
FIG. 9 is a sectional explanatory view of a power reserve display type timepiece according to a preferred embodiment of the present invention equipped with the slip gear structure of FIGS. 1A and 1B as a winding mark transmission wheel.
Figure 10:
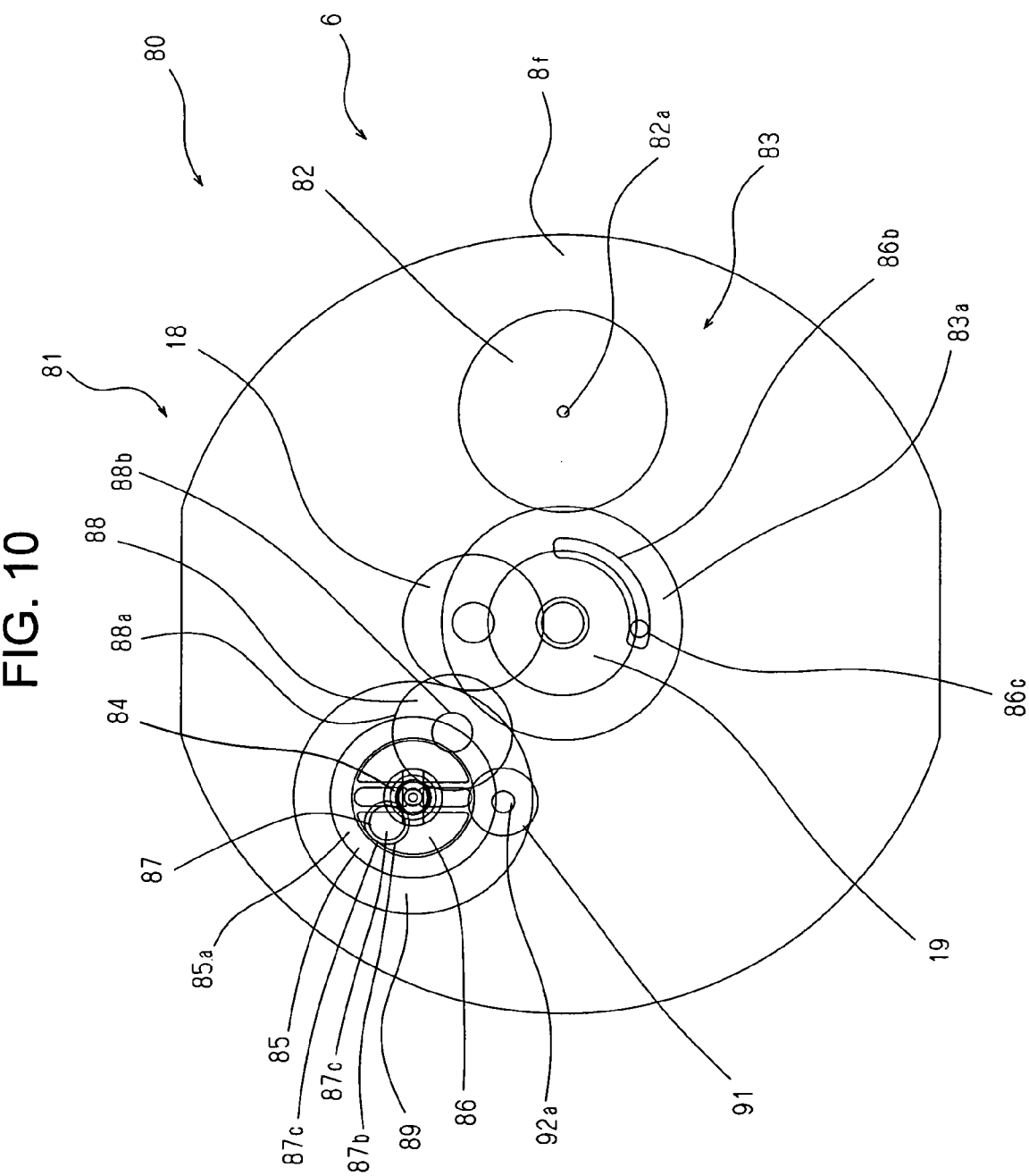
FIG. 10 is a plan explanatory view of a power reserve mechanism portion of the timepiece of FIG. 9.

FIGS. 9 and 10 show a timepiece 6 having a power reserve display mechanism 80 (also referred to as a mainspring power accumulation amount display mechanism, a mainspring winding state display mechanism, a mainspring power display mechanism or the like) equipped with the slip gear structure 1.

As can be seen from FIG. 10, the power reserve display mechanism 80 of the timepiece 6 has a planetary gear mechanism 81 and a winding mark display train wheel 83. The winding mark display train wheel 83 is composed of a winding mark wheel 82, and a winding mark intermediate wheel 83a connecting the planetary gear mechanism 81 to the winding mark wheel 82.

The planetary gear mechanism 81 has a first sun wheel 84 equipped with a first sun gear 84a, a first sun pinion, and a sun arbor integral with these, a second sun wheel 85 equipped with a second sun gear 85a and a second sun pinion and rotatably fit-engaged with the sun arbor, a planetary intermediate wheel 86 equipped with a planetary intermediate gear 86a and rotatably fit-engaged with the sun arbor, a planetary wheel 87 equipped with an eccentric shaft 87c rotatably supported by the planetary intermediate wheel 86 at an eccentric position, a first planetary wheel 87a integral with the eccentric shaft 87c and in mesh with the first sun pinion, and a second planetary wheel 87b integral with the eccentric shaft 87c and in mesh with the second sun pinion, and a planetary transmission wheel 88 integrally equipped with a planetary transmission gear 88a and a planetary transmission pinion 88b and having the planetary transmission pinion 88b in mesh with the gear portion 86a of the planetary intermediate wheel 86.

A pinion portion of a barrel drum 90, that is, a barrel pinion 91 is in mesh with the gear portion 88a of the planetary transmission wheel 88, and a pinion portion of a barrel arbor 92, that is, a barrel arbor pinion 92a, is in mesh with the gear portion 85a of the second sun wheel 85.

On the output side of the planetary gear mechanism 81, there is provided a winding mark transmission wheel 89 connected to a winding mark intermediate wheel 83a of the winding mark display train wheel 83, and, as shown in FIG. 9, the winding mark transmission wheel 89 is formed by the slip gear structure 1 shown in FIGS. 1 through 4.

Mounted to the protruding end of an arbor 82a of the winding mark wheel 82 is a winding mark (power reserve display) hand 82b rotating within the range of a sector-shaped scale on the dial. The winding mark intermediate wheel 86 is provided with a sector-shaped window 86b, and a degree determining pin 86c is loosely fitted to the window 86b to define the rotation range of the winding mark intermediate wheel 86, whereby the rotation range of the winding mark wheel 82 (consequently, the rotation range of the winding mark (power reserve display) hand) is defined.

When winding up a mainspring 93 in the barrel drum 90, the barrel pinion 91 and the planetary transmission wheel 88 in mesh therewith and the planetary intermediate wheel 86 in mesh with the planetary transmission wheel 88 are practically stationary wheels, and the second sun wheel 85 whose gear portion 85a is in mesh with the barrel arbor pinion 92a is rotated in response to the rotation of the barrel arbor 92; in response to the rotation of the second sun wheel 85, the planetary wheel 87 whose second planetary wheel 87b is in mesh with the first sun pinion is rotated; in response to the rotation of the planetary wheel 87, the first sun wheel 84 whose gear portion 84a is in mesh with the first planetary wheel 87a is rotated; in response to the rotation of the first sun wheel 84, the winding mark transmission wheel 89 slip-engaged with the first sun wheel arbor 84c is rotated; in response to the rotation of the winding mark transmission wheel 89, the winding mark intermediate wheel 83a in mesh with the gear portion of the winding mark transmission wheel 89 (the gear portion 10 of the plate-like gear main body portion 2 of the slip gear structure 1) is rotated; and, in response to the rotation of the winding mark intermediate wheel 83a, the winding mark wheel 82 is rotated.

Thus, in response to the winding-up of the mainspring 93 accompanying the rotation of the barrel arbor 92, the winding mark wheel 82 is rotated, and the winding mark (power reserve display) hand is rotated, indicating that the winding-up of the mainspring 93 has progressed.

When the mainspring 93 has been completely wound up, slippage of the mainspring 93 within the barrel drum 90 occurs in response to the rotation of the barrel arbor 92 thereafter, and excessive winding-up of the mainspring 93 is prevented.

On the other hand, in the power reserve mechanism 80, the winding mark transmission wheel 89 directly rotating the winding mark wheel 82 via the winding mark intermediate wheel 83a consists of the slip gear structure 1, so that when the winding mark wheel 82 is rotated to the full winding-up position, and the degree determining pin 86c abuts the full winding-up side end of the arcuate window 86b of the disc-like gear portion of the winding mark intermediate wheel 83a, further rotation of the winding mark wheel 82 and the winding mark intermediate wheel 83a is prohibited, and the winding mark transmission wheel 89 slips with respect to the sun arbor. That is, there is no fear either of the display hand being excessively rotated beyond full winding-up.

In particular, in the power reserve mechanism 80, the winding mark transmission wheel 89 in the form of the slip gear structure 1 is arranged in the portion of the planetary gear mechanism 81 situated immediately before the winding mark wheel 82, and slippage is generated in the winding mark transmission wheel 89, so that the transmission of torque in the other portions is not hindered by slippage, and it is possible to prevent excessive rotation from being forcibly caused.

When the mainspring 93 in the barrel drum 90 is undone, and the hand movement is effected by the energy of the mainspring, the barrel arbor pinion 92a and the second sun wheel 85 whose gear portion 85a is in mesh therewith are stationary wheels, and, in response to the rotation of the barrel drum 90, the planetary transmission wheel 88 whose gear portion 88a is in mesh with the barrel pinion 91 is rotated; in response to the rotation of the planetary transmission wheel 88, the planetary intermediate wheel 86 whose gear portion is in mesh with the planetary transmission wheel 88 is rotated; in response to the rotation of the planetary intermediate wheel 86, the planetary wheel 87 whose second planetary wheel 87b is in mesh with the second sun wheel 85 is rotated; in response to the rotation of the planetary wheel 87, the first sun wheel 84 whose pinion portion is in mesh with the first planetary wheel 87a is rotated; in response to the rotation of the first sun wheel 84, the winding mark transmission wheel 89 slip-engaged with the first sun arbor 84c is rotated; in response to the rotation of the winding mark transmission wheel 89, the winding mark intermediate wheel 83a in mesh with the gear portion of the winding mark transmission wheel 89 (the gear portion 10 of the plate-like gear main body portion 2 of the slip gear structure 1) is rotated; and, in response to the rotation of the winding mark intermediate wheel 83a, the winding mark wheel 82 is rotated.

Thus, in response to the undoing of the mainspring 93 caused by the rotation of the barrel drum 90, the winding mark wheel 82 is rotated, and the winding mark (power reserve display) hand is rotated, indicating that the undoing of the mainspring 93 has progressed.

The planetary intermediate wheel 86, the first and second sun wheels 84 and 85, and the winding mark transmission wheel 89 which constitute the train wheel forming the power reserve mechanism 80 as described above and the majority of which are on the dial side of the main plate 8f, are situated coaxially. Thus, the thickness in the direction Z is large; in this example, the winding mark transmission wheel 89 is situated nearest to the dial side. However, in the planetary gear mechanism 81 of the power reserve mechanism 80, the winding mark transmission wheel 89 is formed by the slip gear structure 1 consisting of the positioning member 3 and the plate-like gear main body portion 2 easy to hold with fingers or the like, so that it can be easily detached from the sun arbor 84c. As a result, the dismantling of the planetary wheel mechanism 81 can also be conducted relatively easily.

In FIGS. 9 and 10, numeral 18 indicates a minute wheel, and numeral 19 indicates an hour wheel. Further, as long as the slip gear structure 1 is slip-engaged with the shaft of the wheel on the output side of the planetary gear mechanism to be connected to the winding mark display train wheel 83, the structure of the planetary gear mechanism and the way it is connected to the barrel pinion 91 and the barrel arbor pinion 92a may be different from those of the planetary gear mechanism 81 shown in FIGS. 9 and 10.

What is claimed is:

1. A slip gear structure comprising: a gear main body portion in the form of an annular plate having along the outer periphery thereof tooth portions constituting a gear, there being provided a pair of spring portions between peripheral walls of an inner opening of the annular plate so as to extend across the opening and to be arranged side by side so as to be opposed to each other; and a positioning member equipped with a small diameter plate-like portion having a central hole with which a shaft is rotatably fit-engaged and a pair of support wall portions arranged on both sides of the central hole and protruding from one surface of the plate-like portion, wherein when the slip gear structure is in a non-fit-engaged state with respect to the shaft, the spring portions of the gear main body assume a state in which they are elastically pressed against corresponding side edge portions of the pair of support wall portions of the positioning member, with central spring portions thereof situated between the corresponding side edge portions of the pair of support wall portions protruding into the central hole; and when the slip gear structure is in a fit-engaged state with respect to the shaft at the central hole, the central spring portions of the spring portions of the gear main body portion are elastically pressed against the shaft for slip engagement with the shaft.

2. A timepiece equipped with a slip gear structure as claimed in claim 1.

3. A timepiece according to claim 2, wherein the slip gear structure constitutes a wheel situated on the dial side of a support substrate and forming a part of a power reserve display mechanism.

4. A timepiece according to claim 2, wherein the slip gear structure constitutes a wheel situated on the dial side of the support substrate and forming a part of a time correction mechanism of a chronograph mechanism.

5. A slip gear structure according to claim 1, wherein, in order that the central spring portions of the pair of spring portions of the annular plate-like gear main body portion may protrude into the central hole, there are provided protruding wall portions protruding from corresponding side edges of the pair of spring portions.

6. A slip gear structure according to claim 5, wherein the protruding wall portions of the central spring portions are provided, at the forward ends thereof, concave portions to be engaged with the outer periphery of the shaft.

7. A slip gear structure according to claim 1, wherein the pair of spring portions of the annular plate-like gear main body portion extend in parallel.

8. A slip gear structure according to claim 1, wherein the pair of support wall portions constitute part of a common column whose center coincides with the center axis of the central hole, and, on the side of the small diameter plate-like portion where the pair of support wall portions exist, the positioning member is equipped with a reamed portion extending in a direction orthogonal to the direction in which the support wall portions are connected.

9. A slip gear structure according to claim 8, wherein the pair of spring portions of the annular plate-like gear main body portion extend in parallel.

10. A slip gear structure according to claim 8, wherein, in order that the central spring portions of the pair of spring portions of the annular plate-like gear main body portion may protrude into the central hole, there are provided protruding wall portions protruding from corresponding side edges of the pair of spring portions.

11. A slip gear structure according to claim 1, wherein the pair of support wall portions of the positioning member are provided with flange-like portions diverged on a side of protruding end portions different from the side thereof opposed to the central hole, and the pair of spring portions of the gear main body portion are held in the thickness direction between the flange-like portions and the small diameter plate-like portion.

12. A slip gear structure according to claim 11, wherein the pair of spring portions of the annular plate-like gear main body portion extend in parallel.

13. A slip gear structure according to claim 11, wherein, in order that the central spring portions of the pair of spring portions of the annular plate-like gear main body portion may protrude into the central hole, there are provided protruding wall portions protruding from corresponding side edges of the pair of spring portions.

14. A slip gear structure according to claim 11, wherein the pair of support wall portions constitute part of a common column whose center coincides with the center axis of the central hole, and, on the side of the small diameter plate-like portion where the pair of support wall portions exist, the positioning member is equipped with a reamed portion extending in a direction orthogonal to the direction in which the support wall portions are connected.

15. A slip gear structure according to claim 14, wherein the pair of spring portions of the annular plate-like gear main body portion extend in parallel.

16. A slip gear structure according to claim 11, wherein the flange-like portions are equipped with, in the vicinity of the outer periphery thereof, portions inclined in a truncated-cone-like fashion.

17. A slip gear structure according to claim 16, wherein the pair of support wall portions constitute part of a common column whose center coincides with the center axis of the central hole, and, on the side of the small diameter plate-like portion where the pair of support wall portions exist, the positioning member is equipped with a reamed portion extending in a direction orthogonal to the direction in which the support wall portions are connected.

18. A slip gear structure according to claim 17, wherein the pair of spring portions of the annular plate-like gear main body portion extend in parallel.

19. A slip gear structure according to claim 16, wherein the pair of spring portions of the annular plate-like gear main body portion extend in parallel.

20. A slip gear structure according to claim 16, wherein, in order that the central spring portions of the pair of spring portions of the annular plate-like gear main body portion may protrude into the central hole, there are provided protruding wall portions protruding from corresponding side edges of the pair of spring portions.

* * * * *